(12) United States Patent
Shimizu

(10) Patent No.: US 6,634,756 B1
(45) Date of Patent: Oct. 21, 2003

(54) BEAM-SPLITTER FOLDED PATH FOR REAR PROJECTION DISPLAYS

(75) Inventor: Jeffrey A. Shimizu, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/183,800

(22) Filed: Jun. 27, 2002

(51) Int. Cl.[7] .............................................. G03B 21/22
(52) U.S. Cl. ...................................................... 353/74
(58) Field of Search ............................. 353/74, 77, 78, 353/81, 33, 449, 460; 348/836

(56) References Cited

U.S. PATENT DOCUMENTS 5,289,287 A * 2/1994 Dargis et al. ............... 348/766
5,791,754 A * 8/1998 Cipolla et al. ................ 353/78
5,829,855 A   11/1998 Uchiyama .................... 353/74
6,461,000 B1 * 10/2002 Magarill ....................... 353/81
6,556,256 B1 * 4/2003 Kato et al. ................... 348/781

FOREIGN PATENT DOCUMENTS

JP           3256036 A      11/1991      .......... G03B/33/12

* cited by examiner

Primary Examiner—William Dowling
(74) Attorney, Agent, or Firm—Eric M. Bram

(57) ABSTRACT

A rear-projection display system comprises a light engine, a beam-splitter that receives light from the light engine, a projection lens that receives an image from the beam-splitter, a rear-projection screen, and a mirror that receives the image from the projection lens and reflects it onto the screen. The beam-splitter has a reflecting element, receives an image, and reflects the image off the reflecting element at an angle of incidence that is substantially unequal to 45 degrees.

20 Claims, 2 Drawing Sheets

BEAM-SPLITTER FOLDED PATH FOR REAR PROJECTION DISPLAYS

FIELD OF TECHNOLOGY

Figure 1:
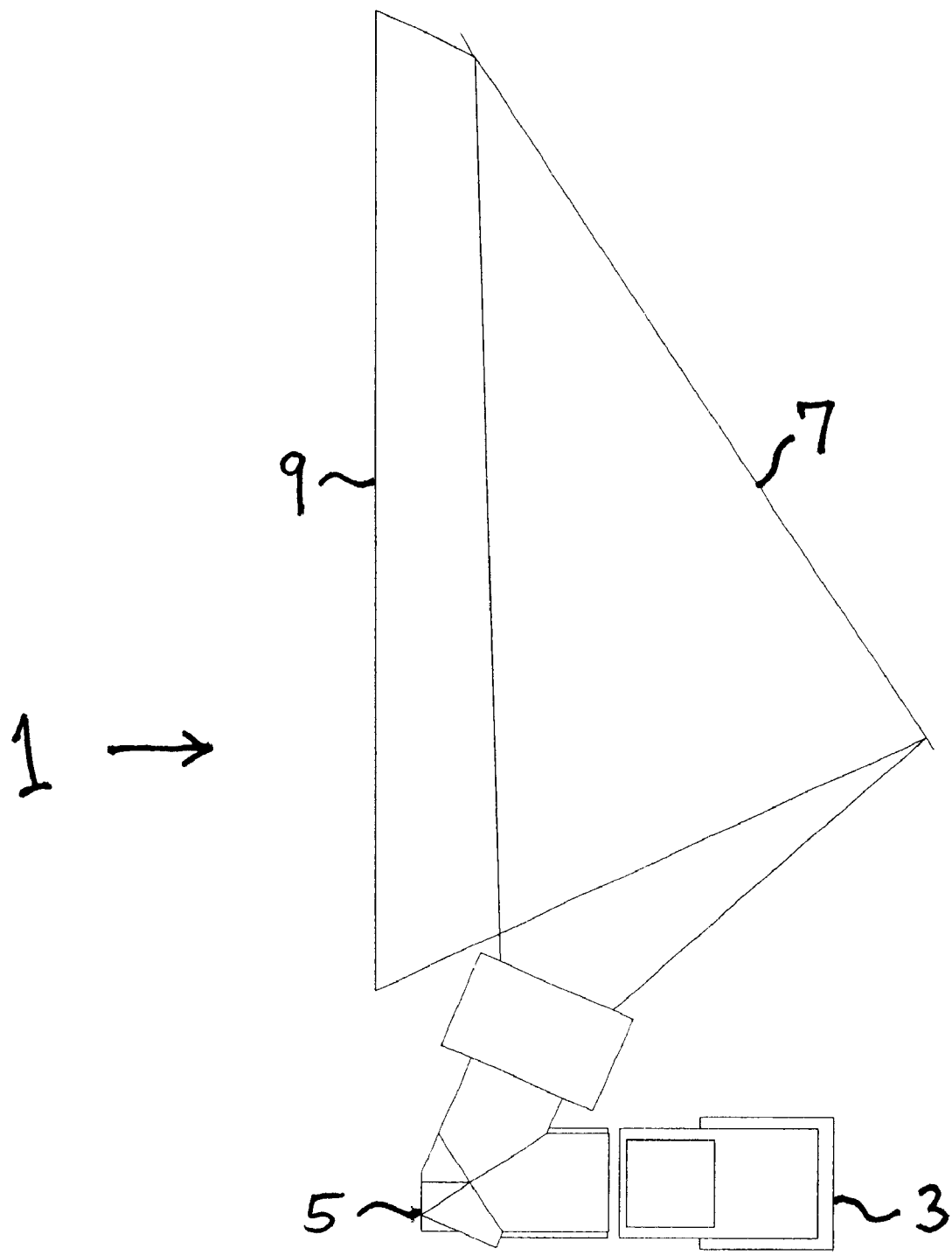

The invention relates to projection televisions and projection displays, and more particularly to compact rear-projection displays.

BACKGROUND AND SUMMARY

Rear screen projection television displays have found great consumer interest due to a large image size. A primary disadvantage is the set volume and depth. There is great desire to reduce set size but this is difficult as a practical matter, and is costly with present CRT based projection systems.

Microdisplay based systems such as Liquid Crystal Display (LCD), Digital Micromirror Device (DMD), or Liquid Crystal on Silicon (LCoS) can achieve much smaller system volume than for CRT projection displays. This is due to a smaller engine size and projection from a single projection lens as opposed to three tubes and lenses for CRT displays. Very attractive system dimensions have been announced for these microdisplay systems. Recent product announcements include for example a 55-inch diagonal wide screen set with a system depth of 18 inches, and a 50-inch diagonal wide screen set with a depth of 35 cm. These sets make use of a single large mirror, known in the art as a fold mirror.

Narrow depth is obtained with a wide-angle projection lens. To achieve this, light from the projection lens must be directed to the fold mirror which is placed upwards and to the rear of the unit. One way to achieve this desired pointing direction by incorporating a fold mirror into the projection lens, making the projection lens into a so-called folded projection lens. Examples of compact rear projection systems that have been constructed with the use of a folded projection lens include the Sony GRAND WEGA and the Sharp LC-R60HDU. Both these systems use three transmissive LCD panels. For these systems, the folded projection lens must be used in order to align the engine parallel to the bottom of the cabinet. However, addition of a fold mirror leads to increased lens cost, reduced performance, or both.

It is advantageous therefore to reduce the depth of rear-projection displays, while keeping the manufacturing costs as low as possible. To address one or more of the above issues, in one aspect of the invention, the applicant proposes utilizing a prism, for example a polarizing beam-splitter (PBS) present in an LCoS projection display, instead of conventional structure for a folded projection lens.

Accordingly, in a first aspect of the invention, a rear-projection display system comprises a light engine, a beam-splitter that receives light from the light engine, a projection lens that receives an image from the beam-splitter, a rear-projection screen, and a mirror that receives the image from the projection lens and reflects it onto the screen. The beam-splitter has a reflecting element, receives an image, and reflects the image off the reflecting element at an angle of incidence that is substantially unequal to 45 degrees.

In a second aspect of the invention, a rear-projection display system comprises a light engine; beam splitting means that receives light from the light engine, receives an image, and reflects the image with an angle of incidence substantially unequal to 45 degrees; a projection lens positioned to receive the image from the beam splitting means; a mirror positioned to receive the image from the projection lens; and a rear-projection screen positioned to receive the image from the mirror.

In a third aspect of the invention, a rear-projection display method comprises using light from a light engine to form an image; reflecting the image off a reflecting element to a projection lens; projecting the image to a mirror; and reflecting the image from the mirror to a rear-projection screen. The image is reflected from the reflecting element at an angle of incidence that is substantially unequal to 45 degrees.

BRIEF DESCRIPTION OF THE DRAWING FIGURES

Figure 2:
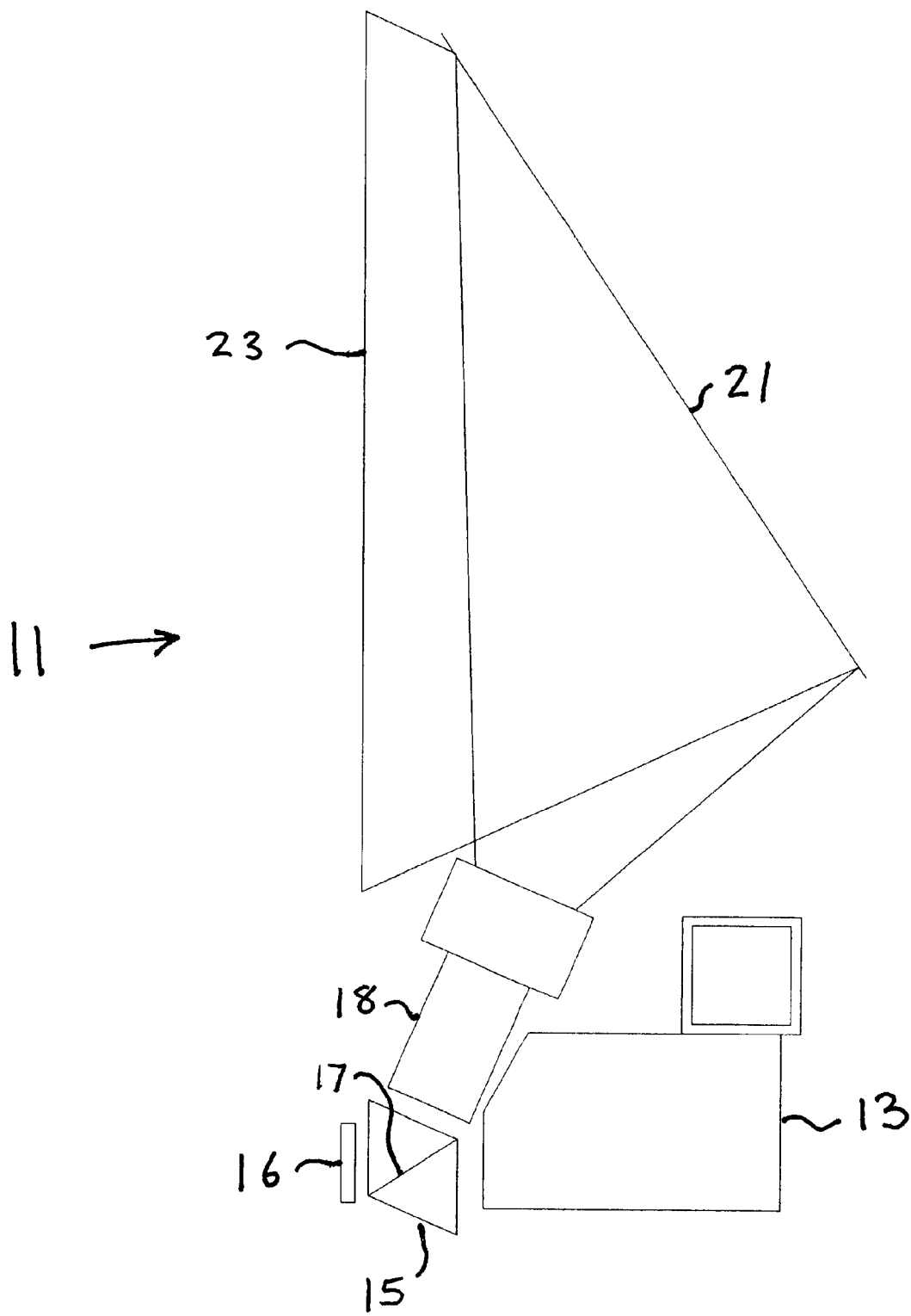

The invention may be understood with reference to the following drawing figures, which are not necessarily drawn to scale, and in which:

FIG. 1 illustrates geometry of a rear-projection display system with a folded projection lens; and FIG. 2 illustrates geometry of a rear-projection display system employing a polarizing beam-splitter according to one embodiment of the invention.

DETAILED DESCRIPTION

FIG. 1 gives an example of system geometry using a folded projection lens as it may be applied to LCos rear-projection systems. The rear-projection system 1 in this embodiment includes a light engine 3 that introduces light into a folded projection lens 5. The folded projection lens 5 projects the light onto a fold mirror 7 whence it is reflected onto a screen 9.

FIG. 2 shows one embodiment of a rear-projection system 11 that utilizes the invention. This particular embodiment is for a single panel LCoS system. In this system a light engine 13 introduces light through a polarizing beam-splitter (PBS) 15 placed between an LCoS imager 16 and a projection lens 18 that projects the light onto a fold mirror 21 whence it is reflected onto a screen 23. Depending on what embodiment of the invention is used, the exact projection path may vary. For example, in some embodiments the projection path may be in transmission through the PBS. In other embodiments the projection path may be in reflection from the interface of the PBS.

Typically in single panel LCos rear-projection systems, the PBS is designed with the hypotenuse at a 45-degree angle in order to fold the path by 90 degrees. In other words, the center ray of the image reflects off the interface of the PBS with a 45-degree angle of incidence. This arrangement keeps the light path square and allows minimum dimensions for the PBS. But when the light comes out square, the entire light engine must be tilted to aim the light towards the fold mirror. Tilting of the light engine requires additional space at the bottom, which increases system height and volume.

The applicant has found that it is preferable instead to use a PBS 15 with an interface 17 inclined at an angle greater than 45 degrees. For example, the FIG. 2 illustrated embodiment could have a system geometry with a PBS hypotenuse at 56 degrees. In other words, the center ray of an image from the LCos panel 16 will reflect off the PBS interface 17 with an angle of incidence of about 56 degrees. This angle causes the light of the image to aim backwards in the cabinet (not shown) towards the fold mirror 21. A straight projection lens 18 can be used and the light engine 13 lies square to the bottom of the unit.

The PBS 15 can be for example the type that utilizes a glass prism of a "MacNielle" type has described in U.S. Pat.

Nos. 2,403,731 and 5,453,859 for instance. With a Mac-Nielle PBS the coating materials are chosen along with the prism substrate such that light strikes the coating at or near Brewster's polarizing angle. The relationship between the low index, nL, high index, nH, prism glass index, nG, and polarizing angle θ is given by $$\sin^2(\theta) = \frac{n_H^2 n_L^2}{n_G^2(n_H^2 + n_L^2)}.$$

For one embodiment incorporating the invention, a polarizing angle is greater than 45 degrees, as mentioned earlier, and more preferably greater than about 50 degrees. Common coating materials are $TiO_2$ ($n_H$=2.3) and $SiO_2$ ($n_L$=1.46) for example. A common glass substrate is BK7, n=1.52, which then has a polarizing angle of 54 degrees. This would be a good choice. However, stress birefringence properties may warrant a different choice. For SF2, n=1.65, the polarizing angle would be 48 degrees. The angle could be increased with different coating materials. For example, using $Al_2O_2$ ($n_H$=1.62) raises the polarizing angle to 53 degrees. Alternatively a lower index glass such as SK5, n=1.59 can be used, with the first two materials gives a polarizing angle of 51 degrees. Finally, the hypotenuse of the prism may be set at an angle greater than the polarizing angle and good performance is still achieved.

There are alternatives to a glass based MacNielle PBS that offer greater flexibility in choosing the polarizing angle. Examples include a wire grid PBS or a polymeric film wide-angle PBS. These types may be comprised in a polarizing beam-splitter with the hypotenuse at an angle greater than about 50 degrees in order to direct the light.

Other embodiments, variations of embodiments, and equivalents, as well as other aspects, objects, and advantages of the invention, will be apparent to those skilled in the art and can be obtained from a study of the drawings, the disclosure, and the appended claims.

For example, LCos architectures other than the single panel embodiments discussed above may utilize the invention. More than one PBS may be used as well. Further, the geometry of the light path may be adapted in a number of ways to direct the light towards the projection lens, other than that shown in the illustrated embodiment. Further, other microdisplay-based architectures may make use of this concept. For example a (Texas Instruments) DLP-based projection display often makes use of a beam splitting prism near the image. The geometry of this beam-splitter may be arranged to provide beam direction in accordance with the invention.

Also, other optical elements might possibly be placed in the various portions of the light and/or image path. For example, in the claims where an element is "disposed to receive light from" another element, this includes a case where a third element (a mirror or refracting lens for example) is interposed between the two aforementioned recited elements. Further, embodiments are possible wherein the light engine is situated on the other side of the PBS, so that the angle of incidence of reflection will be less, instead of greater, than 45 degrees. In yet other embodiments, a different type of beam-splitter may be used, instead of a PBS, and/or the image may be generated in other ways than by using an LCos imager.

I claim:

1. A rear-projection display system comprising:
 a light engine;
 a beam-splitter having a reflecting element, the beam-splitter disposed to receive light from the light engine, to receive an image, and for reflecting the image off the reflecting element;
 a projection lens disposed to receive the image from the beam-splitter;
 a mirror disposed to receive the image from the projection lens; and
 a rear-projection screen disposed to receive the image from the mirror,
 wherein the image is reflected from the reflecting element of the beam-splitter at an angle of incidence that is substantially unequal to 45 degrees.

2. The rear-projection display system of claim 1, wherein the angle of incidence is greater than 45.

3. The rear-projection display system of claim 1, wherein the angle of incidence varies from 45 degrees by at least five degrees.

4. The rear-projection display system of claim 1, wherein the angle of incidence is greater than 45 degrees.

5. The rear-projection display system of claim 1, wherein the angle of incidence is greater than 50 degrees.

6. The rear-projection display system of claim 1, wherein the beam-splitter is a polarizing beam-splitter (PBS).

7. The rear-projection display system of claim 6, wherein the PBS has a polarizing angle of greater than 50 degrees.

8. The rear-projection display system of claim 6, wherein the PBS utilizes $Al_2O$ as a coating material.

9. The rear-projection display system of claim 6, wherein the PBS comprises a glass substrate selected from the group including BK7 and SF2.

10. The rear-projection display system of claim 6, wherein the PBS utilizes a glass prism of a MacNielle type.

11. The rear-projection display system of claim 6, wherein the PBS is one of a wire grid PBS and a polymeric film wide-angle PBS.

12. A rear-projection display system comprising:
 a light engine;
 beam splitting means for receiving light from the light engine, for receiving an image, and for reflecting the image with an angle of incidence that is substantially unequal to 45 degrees;
 a projection lens disposed to receive the image from the beam splitting means;
 a mirror disposed to receive the image from the projection lens; and
 a rear-projection screen disposed to receive the image from the mirror.

13. The rear-projection display system of claim 12, wherein the angle of incidence is greater than 45.

14. The rear-projection display system of claim 12, wherein the angle of incidence varies from 45 degrees by at least five degrees.

15. The rear-projection display system of claim 12, wherein the angle of incidence is greater than 45 degrees.

16. The rear-projection display system of claim 12, wherein the angle of incidence is greater than 50 degrees.

17. A rear-projection display method comprising:
 using light from a light engine to form an image;
 reflecting the image off a reflecting element to a projection lens;
 projecting the image to a mirror; and
 reflecting the image from the mirror to a rear-projection screen,
 wherein the image is reflected from the reflecting element at an angle of incidence that is substantially unequal to 45 degrees.

18. The rear-projection display method of claim 17, wherein the reflecting element is comprised by a polarizing beam-splitter (PBS).

19. The rear-projection display method of claim 18, wherein the angle of incidence is greater than 48 degrees.

20. The rear-projection display method of claim 18, wherein the angle of incidence varies from 45 degrees by at least three degrees.

* * * * *